United States Patent
Mimms et al.

(10) Patent No.: US 9,864,606 B2
(45) Date of Patent: Jan. 9, 2018

(54) METHODS FOR CONFIGURABLE HARDWARE LOGIC DEVICE RELOADING AND DEVICES THEREOF

(71) Applicant: F5 Networks, Inc., Seattle, WA (US)

(72) Inventors: Alan B. Mimms, Spokane, WA (US); Tom Troksa, Veradale, WA (US)

(73) Assignee: F5 Networks, Inc., Seattle, WA (US)

( * ) Notice: Subject to any disclaimer, the term of this patent is extended or adjusted under 35 U.S.C. 154(b) by 345 days.

(21) Appl. No.: 14/476,424

(22) Filed: Sep. 3, 2014

(65) Prior Publication Data

US 2015/0121060 A1  Apr. 30, 2015

Related U.S. Application Data

(60) Provisional application No. 61/873,960, filed on Sep. 5, 2013.

(51) Int. Cl.
*G06F 9/44* (2006.01)
*G06F 13/42* (2006.01)
(Continued)

(52) U.S. Cl.
CPC ............. *G06F 9/4413* (2013.01); *G06F 8/65* (2013.01); *G06F 9/441* (2013.01); *G06F 13/4282* (2013.01); *G06F 15/7871* (2013.01)

(58) Field of Classification Search
None
See application file for complete search history.

(56) References Cited

U.S. PATENT DOCUMENTS

| 4,914,650 A | 4/1990 | Sriram |
| 5,388,237 A | 2/1995 | Sodos |

(Continued)

FOREIGN PATENT DOCUMENTS

| EP | 1813084 A1 | 8/2007 |
| WO | 2004079930 A2 | 9/2004 |

(Continued)

OTHER PUBLICATIONS

John Keithley L Difuntorum et al., "A USB 2.0 Controller for an ARM7TDM-S Processor Implemented in FPGA", Tencon 2011—2011 IEEE Region 10 Conference, IEEE, Nov. 21, 2011 (Nov. 21, 2011), pp. 689-692, XP032092582, DOI: 10.1109/Tencon.2011.6129196, ISBN: 978-1-3477-0256-3.

(Continued)

*Primary Examiner* — Kim Huynh
*Assistant Examiner* — Joshua Neveln
(74) *Attorney, Agent, or Firm* — LeClairRyan, a Professional Corporation (57) ABSTRACT

A method and host computing device that restricts access by one or more applications to a configurable hardware logic device over a bus. At least a portion of the configurable hardware logic device is reconfigured. A determination is made when unplug and plug events have been generated by the configurable hardware logic device. The unplug and plug events are generated without disconnecting power supplied to the configurable hardware logic device. The configurable hardware logic device is re-enumerated on the bus when the determining indicates the unplug and plug events have been generated by the configurable hardware logic device.

20 Claims, 4 Drawing Sheets

(51) Int. Cl.
  *G06F 9/445* (2006.01)
  *G06F 15/78* (2006.01)

(56) References Cited

U.S. PATENT DOCUMENTS

| | | | |
|---|---|---|---|
| 5,477,541 A | 12/1995 | White et al. | |
| 5,699,361 A | 12/1997 | Ding et al. | |
| 5,742,765 A | 4/1998 | Wong et al. | |
| 5,761,534 A | 6/1998 | Lundberg et al. | |
| 5,797,033 A | 8/1998 | Ecclesine | |
| 5,812,867 A * | 9/1998 | Basset | G06F 9/4411 710/104 |
| 5,828,835 A | 10/1998 | Isfeld et al. | |
| 5,941,988 A | 8/1999 | Bhagwat et al. | |
| 6,026,090 A | 2/2000 | Benson et al. | |
| 6,026,443 A | 2/2000 | Oskouy et al. | |
| 6,070,219 A | 5/2000 | McAlpine et al. | |
| 6,115,802 A | 9/2000 | Tock et al. | |
| 6,347,337 B1 | 2/2002 | Shah et al. | |
| 6,388,989 B1 | 5/2002 | Malhotra | |
| 6,493,770 B1 | 12/2002 | Sartore et al. | |
| 6,529,508 B1 | 3/2003 | Li et al. | |
| 6,574,220 B1 | 6/2003 | Petty | |
| 6,643,748 B1 * | 11/2003 | Wieland | G06F 13/387 707/999.008 |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,785,236 B1 | 8/2004 | Lo et al. | |
| 6,820,133 B1 | 11/2004 | Grove et al. | |
| 6,904,040 B2 | 6/2005 | Salapura et al. | |
| 6,934,776 B2 | 8/2005 | Connor et al. | |
| 6,999,457 B2 | 2/2006 | Shinohara | |
| 7,046,628 B2 | 5/2006 | Luhmann et al. | |
| 7,065,630 B1 | 6/2006 | Ledebohm et al. | |
| 7,107,348 B2 | 9/2006 | Shimada et al. | |
| 7,117,308 B1 | 10/2006 | Mitten et al. | |
| 7,124,196 B2 | 10/2006 | Hooper | |
| 7,142,540 B2 | 11/2006 | Hendel et al. | |
| 7,164,678 B2 | 1/2007 | Connor | |
| 7,174,393 B2 | 2/2007 | Boucher et al. | |
| 7,236,491 B2 | 6/2007 | Tsao et al. | |
| 7,272,150 B2 | 9/2007 | Bly et al. | |
| 7,281,030 B1 | 10/2007 | Davis | |
| 7,324,525 B2 | 1/2008 | Fuhs et al. | |
| 7,327,674 B2 | 2/2008 | Eberle et al. | |
| 7,349,405 B2 | 3/2008 | Deforche | |
| 7,353,326 B2 | 4/2008 | Cho et al. | |
| 7,355,977 B1 | 4/2008 | Li | |
| 7,376,772 B2 | 5/2008 | Fallon | |
| 7,403,542 B1 | 7/2008 | Thompson | |
| 7,411,957 B2 | 8/2008 | Stacy et al. | |
| 7,415,034 B2 | 8/2008 | Muller et al. | |
| 7,420,931 B2 | 9/2008 | Nanda et al. | |
| 7,457,313 B2 | 11/2008 | Patrick | |
| 7,475,122 B2 | 1/2009 | Azpitarte | |
| 7,478,186 B1 | 1/2009 | Onufryk et al. | |
| 7,496,689 B2 | 2/2009 | Sharp et al. | |
| 7,496,695 B2 | 2/2009 | Go et al. | |
| 7,500,028 B2 | 3/2009 | Yamagishi | |
| 7,512,078 B2 | 3/2009 | Swain | |
| 7,512,721 B1 | 3/2009 | Olson | |
| 7,533,197 B2 | 5/2009 | Leonard et al. | |
| 7,552,232 B2 | 6/2009 | Helmer, Jr. et al. | |
| 7,558,910 B2 | 7/2009 | Alverson et al. | |
| 7,571,299 B2 | 8/2009 | Loeb | |
| 7,590,753 B2 | 9/2009 | Wolde et al. | |
| 7,620,046 B2 | 11/2009 | Ronciak et al. | |
| 7,620,071 B2 | 11/2009 | Makineni et al. | |
| 7,621,162 B2 | 11/2009 | Bartky | |
| 7,647,416 B2 | 1/2010 | Chiang et al. | |
| 7,657,659 B1 | 2/2010 | Lambeth et al. | |
| 7,660,916 B2 | 2/2010 | Moskalev et al. | |
| 7,668,727 B2 | 2/2010 | Mitchell et al. | |
| 7,668,851 B2 | 2/2010 | Triplett | |
| 7,710,989 B2 | 5/2010 | Chew | |
| 7,729,239 B1 | 6/2010 | Aronov et al. | |
| 7,734,809 B2 | 6/2010 | Joshi et al. | |
| 7,735,099 B1 | 6/2010 | Micalizzi, Jr. | |
| 7,742,412 B1 | 6/2010 | Medina | |
| 7,784,093 B2 | 8/2010 | Deng et al. | |
| 7,813,277 B2 | 10/2010 | Okholm et al. | |
| 7,826,487 B1 | 11/2010 | Mukerji et al. | |
| 7,840,841 B2 | 11/2010 | Huang et al. | |
| 7,877,524 B1 | 1/2011 | Annem et al. | |
| 7,916,728 B1 | 3/2011 | Mimms | |
| 7,929,433 B2 | 4/2011 | Husak et al. | |
| 7,936,772 B2 | 5/2011 | Kashyap | |
| 7,991,918 B2 | 8/2011 | Jha et al. | |
| 7,996,569 B2 | 8/2011 | Aloni et al. | |
| 8,006,016 B2 | 8/2011 | Muller et al. | |
| 8,077,620 B2 | 12/2011 | Solomon et al. | |
| 8,099,528 B2 | 1/2012 | Millet et al. | |
| 8,103,809 B1 | 1/2012 | Michels et al. | |
| 8,112,491 B1 | 2/2012 | Michels et al. | |
| 8,112,594 B2 | 2/2012 | Giacomoni et al. | |
| 8,233,380 B2 | 7/2012 | Subramanian et al. | |
| 8,279,865 B2 | 10/2012 | Giacomoni et al. | |
| 8,306,036 B1 | 11/2012 | Bollay et al. | |
| 8,346,993 B2 | 1/2013 | Michels et al. | |
| 8,347,118 B1 | 1/2013 | Wyatt et al. | |
| 8,447,884 B1 | 5/2013 | Baumann | |
| 8,448,234 B2 | 5/2013 | Mondaeev et al. | |
| 8,799,403 B2 | 8/2014 | Chan et al. | |
| 8,848,715 B2 | 9/2014 | Izenberg et al. | |
| 8,880,632 B1 | 11/2014 | Michels et al. | |
| 8,880,696 B1 | 11/2014 | Michels et al. | |
| 8,984,178 B2 | 3/2015 | Michels et al. | |
| 9,032,113 B2 | 5/2015 | Conroy et al. | |
| 2001/0038629 A1 | 11/2001 | Shinohara | |
| 2002/0156927 A1 | 10/2002 | Boucher et al. | |
| 2003/0067930 A1 | 4/2003 | Salapura et al. | |
| 2003/0204636 A1 | 10/2003 | Greenblat et al. | |
| 2004/0032830 A1 | 2/2004 | Bly et al. | |
| 2004/0062245 A1 | 4/2004 | Sharp et al. | |
| 2004/0202161 A1 | 10/2004 | Stachura et al. | |
| 2004/0249881 A1 | 12/2004 | Jha et al. | |
| 2004/0249948 A1 | 12/2004 | Sethi et al. | |
| 2004/0267897 A1 | 12/2004 | Hill et al. | |
| 2005/0007991 A1 | 1/2005 | Ton et al. | |
| 2005/0083952 A1 | 4/2005 | Swain | |
| 2005/0091390 A1 | 4/2005 | Helmer et al. | |
| 2005/0114559 A1 | 5/2005 | Miller | |
| 2005/0141427 A1 | 6/2005 | Bartky | |
| 2005/0160196 A1 * | 7/2005 | Dutton | G06K 7/0013 710/10 |
| 2005/0175014 A1 | 8/2005 | Patrick | |
| 2005/0213570 A1 | 9/2005 | Stacy et al. | |
| 2005/0226234 A1 | 10/2005 | Sano et al. | |
| 2006/0007928 A1 | 1/2006 | Sangillo | |
| 2006/0067349 A1 | 3/2006 | Ronciak et al. | |
| 2006/0104303 A1 | 5/2006 | Makineni et al. | |
| 2006/0221832 A1 | 10/2006 | Muller et al. | |
| 2006/0221835 A1 | 10/2006 | Sweeney et al. | |
| 2006/0224820 A1 | 10/2006 | Cho et al. | |
| 2006/0235996 A1 | 10/2006 | Wolde et al. | |
| 2006/0288128 A1 | 12/2006 | Moskalev et al. | |
| 2007/0162619 A1 | 7/2007 | Aloni et al. | |
| 2008/0126509 A1 | 5/2008 | Subramanian et al. | |
| 2008/0184248 A1 | 7/2008 | Barua et al. | |
| 2008/0201772 A1 | 8/2008 | Mondaeev et al. | |
| 2008/0219279 A1 | 9/2008 | Chew | |
| 2009/0003204 A1 | 1/2009 | Okholm et al. | |
| 2009/0016217 A1 | 1/2009 | Kashyap | |
| 2009/0089619 A1 | 4/2009 | Huang et al. | |
| 2009/0154459 A1 | 6/2009 | Husak et al. | |
| 2009/0222598 A1 | 9/2009 | Hayden | |
| 2009/0248911 A1 | 10/2009 | Conroy et al. | |
| 2009/0279559 A1 | 11/2009 | Wong et al. | |
| 2010/0082849 A1 | 4/2010 | Millet et al. | |
| 2010/0085875 A1 | 4/2010 | Solomon et al. | |
| 2010/0094945 A1 | 4/2010 | Chan et al. | |
| 2011/0228781 A1 | 9/2011 | Izenberg et al. | |
| 2012/0191800 A1 | 7/2012 | Michels et al. | |

(56) References Cited

U.S. PATENT DOCUMENTS

| | | | |
|---|---|---|---|
| 2013/0132614 A1 | 5/2013 | Bajpai et al. | |
| 2013/0250777 A1 | 9/2013 | Ziegler | |
| 2014/0032695 A1 | 1/2014 | Michels et al. | |
| 2014/0185442 A1 | 7/2014 | Newman et al. | |
| 2014/0301207 A1 | 10/2014 | Durand et al. | |

FOREIGN PATENT DOCUMENTS

| | | |
|---|---|---|
| WO | 2006055494 A1 | 5/2006 |
| WO | 2009158680 A1 | 12/2009 |

OTHER PUBLICATIONS

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

Bell Laboratories, Lucent Technologies, "Layer 4/7 Switching and Other Custom IP Traffic Processing using the NEPPI API," Bell Laboratories, Lucent Technologies, pp. 1-11, Murray Hill, NJ.

Cavium Networks, "PCI, PCI-X," at (http://www.cavium.com/acceleration_boards_PCI_PCI-X.htm (Downloaded Oct. 2008), Cavium Networks—Products > Acceleration Boards > PCI, PCI-X).

Cavium Networks, "Nitrox™ XL Security Acceleration Modules PCI 3V or 3V/5V-Universal Boards for SSL and IPSec," at http://www.Caviumnetworks.com, 2002, pp. 1, Mountain View, CA USA.

Cavium Networks, "Cavium Networks Product Selector Guide—Single & Multi-Core MIPS Processors, Security Processors and Accelerator Boards," 2008, pp. 1-44, Mountain View, CA, US.

"Chapter 15, Memory Mapping and DMA," Memory Management in Linux, ch15.13676, accessed on Jan. 25, 2005, pp. 412-463.

Comtech AHA Corporation, "Comtech AHA Announces 3.0 Gbps GZIP Compression/Decompression Accelerator AHA362-PCIX offers high-speed GZIP compression and decompression," www.aha.com, Apr. 20, 2005, pp. 1-2, Moscow, ID, USA.

Comtech AHA Corporation, "Comtech AHA Announces GZIP Compression and Decompression IC Offers the highest speed and compression ratio performance in hardware on the market," www.aha.com, Jun. 26, 2007, pp. 1-2, Moscow, ID, USA.

EventHelix, "DMA and Interrupt Handling," <http://www.eventhelix.com/RealtimeMantra/FaultHandling/dma_interrupt_handling.htm>, Jan. 29, 2010, pp. 1-4, EventHelix.com.

EventHelix, "TCP-Transmission Control Protocol (TCP Fast Retransmit and Recovery)," Mar. 28, 2002, pp. 1-5, EventHelix.com.

Harvey et al., "DMA Fundamentals on Various PC Platforms," Application Note 011, Apr. 1999, pp. 1-20, National Instruments Corporation.

Mangino, John, "Using DMA with High Performance Peripherals to Maximize System Performance," WW TMS470 Catalog Applications, SPNA105 Jan. 2007, pp. 1-23.

Mogul, Jeffrey C., "The Case for Persistent-Connection HTTP," SIGCOMM '95, Digital Equipment Corporation Western Research Laboratory, 1995, pp. 1-15, Cambridge, Maine.

"Plan 9 kernel history: overview / file list / diff list," <http://switch.com/cgi-bin/plan9history.cgi?f=2001/0126/pc/therga620.com>, accessed Oct. 22, 2007, pp. 1-16.

Rabinovich et al., "DHTTP: An Efficient and Cache-Friendly Transfer Protocol for the Web," IEEE/ACM Transactions on Networking, Dec. 2004, pp. 1007-1020, vol. 12, No. 6.

Salchow, JR., KJ, "Clustered Multiprocessing: Changing the Rules of the Performance Game," F5 White Paper, Jan. 2008, pp. 1-11, F5 Networks, Inc.

Stevens, W., "TCP Slow Start, Congestion Avoidance, Fast Retransmit, and Fast Recovery Algorithms," Network Working Group, RFC 2001, Jan. 1997, pp. 1-6.

Wadge, Wallace, "Achieving Gigabit Performance on Programmable Ethernet Network Interface Cards," May 29, 2001, pp. 1-9.

Welch, Von, "A User's Guide to TCP Windows," http://www.vonwelch.com/report/tcp_windows, updated 1996, last accessed Jan. 29, 2010, pp. 1-5.

Wikipedia, "Direct memory access," <http://en.wikipedia.org/wiki/Direct_memory_access>, accessed Jan. 29, 2010, pp. 1-6.

Wikipedia, "Nagle's algorithm," <http://en.wikipedia.org/wiki/Nagle%27s_algorithm>, 2 pages.

* cited by examiner

METHODS FOR CONFIGURABLE HARDWARE LOGIC DEVICE RELOADING AND DEVICES THEREOF

This application claims the benefit of U.S. Provisional Patent Application No. 61/873,960, filed on Sep. 5, 2013, which is hereby incorporated by reference in its entirety.

FIELD

This technology generally relates to methods and devices for reloading configurable hardware logic devices.

BACKGROUND

Configurable hardware logic devices, such as field programmable gate arrays (FPGAs), for example, are increasingly used to execute functionality for host computing devices. Configurable hardware logic devices often require reloading to change the configuration of the devices to perform different functionality. Some configurable hardware logic devices support partial reloading, allowing the configurable hardware logic device to remain on the bus during reconfiguration.

However, in many cases, the configurable hardware logic device interface with a processor of the host device is significantly changed by the reconfiguration. In these cases, registers, bus numbers, interrupts, and/or address space, for example, must be changed, requiring a re-enumeration of the configurable hardware logic device on the bus by the operating system.

Accordingly, in cases in which the functionality of a configurable hardware logic device is significantly changed requiring re-enumeration, the host computing device must perform a reboot. When the host computing device powers back up in the reboot, the operating system will re-enumerate the configurable hardware logic device on the bus. Unfortunately, the rebooting of the host computing device can result in a significant disruption to the performance of the host computing device for users and/or other networked devices.

Additionally, a bus attached to the configurable hardware logic device cannot be used to send the new configuration to the configurable hardware logic device in these cases. Instead, the configurable hardware logic device must be reconfigured during power up of the host computing device. For example, the new configuration can be loaded into non-volatile memory, such as an EEPROM, which is used to load the new configuration when the host computing device powers up. Since new configurations can be fairly large, this method for reloading the configurable hardware logic device takes a significant amount of time, in addition to the time required to reboot the host computing device, which is undesirable.

SUMMARY

A method for configurable hardware logic device reloading includes restricting by a host computing device access by one or more applications to a configurable hardware logic device over a bus. At least a portion of the configurable hardware logic device is reconfigured by the host computing device. A determination is made by the host computing device when unplug and plug events have been generated by the configurable hardware logic device. The unplug and plug events are generated without disconnecting power supplied to the configurable hardware logic device. The configurable hardware logic device is re-enumerated by the host computing device on the bus when the determining indicates the unplug and plug events have been generated by the configurable hardware logic device.

A host computing device includes a memory coupled to a processor and a configurable hardware logic device coupled to the processor by a bus. The processor is configured to execute programmed instructions stored in the memory including restricting access by one or more applications to the configurable hardware logic device over the bus. At least a portion of the configurable hardware logic device is reconfigured. A determination is made by the host computing device when unplug and plug events have been generated. The unplug and plug events are generated without disconnecting power supplied to the configurable hardware logic device. The configurable hardware logic device is re-enumerated on the bus when the determining indicates the unplug and plug events have been generated by the configurable hardware logic device.

This technology provides a number of advantages including methods and devices that facilitate reloading of a configurable hardware logic device more efficiently and without rebooting a host computing device or disconnecting the power supplied to the configurable hardware logic device. With this technology, the configurable hardware logic device generates warm unplug and plug events subsequent to being reloaded or reconfigured thereby causing an operating system of a host computing device to re-enumerate the configurable hardware logic device on a bus. Accordingly, the configurable hardware logic device can be reloaded with a new configuration with reduced disruption to the host computing device.

DETAILED DESCRIPTION

Figure 1:
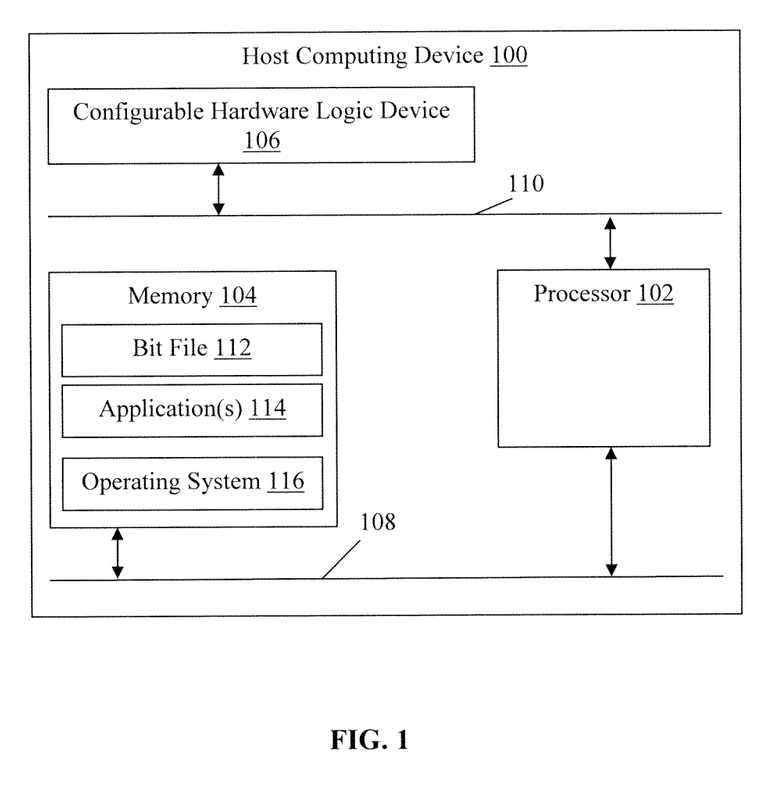
FIG. 1 is a block diagram of an exemplary host computing device with a configurable hardware logic device.

Referring to FIG. 1, a block diagram of an exemplary host computing device 100 including a processor 102 and a memory 104 coupled together by a first bus 108 and a configurable hardware logic device 106 coupled to the processor 102 by a second bus 110 is illustrated. The host computing device 100 may include other types and numbers of elements in other configurations. This technology provides a number of advantages including methods and devices that reduce the time required to reload a configurable hardware logic device with a new configuration while allowing an operating system of a host computing device to maintain full operation.

The processor 102 of the host computing device 100 may execute programmed instructions stored in the memory 104 of the host computing device 100 for any number and type of functions. The processor 102 of the host computing device 100 may include one or more central processing units (CPUs) or general purpose processors with one or more processing cores, for example.

The memory 104 of the host computing device 100 stores these programmed instructions for one or more aspects of the present technology, as described and illustrated herein, although some or all of the programmed instructions could be stored and executed elsewhere. A variety of different types of memory storage devices, such as a random access memory (RAM), a read only memory (ROM), hard disk, or other computer readable medium which is read from and written to by a magnetic, optical, or other reading and writing system that is coupled to the processor, can be used for the memory 104 in the host computing device 100.

In this example, the memory includes a bit file 112, application(s) 114, and an operating system 116, although the memory can include other types of data, files, content, and/or applications. The bit file 112 can include a configuration to be loaded onto the configurable hardware logic device 106, for example, although other methods of storing configurations and loading configurations on the configurable hardware logic device 106 can also be used.

The application(s) 114 can include any programs installed on the host computing device 100 that are used to carry out functionality on behalf of the host computing device 100. Optionally, the application(s) 114 include a device driver configured to support the reconfigured configurable hardware logic device, as described and illustrated in more detail later. The operating system 116 can execute the application(s) 114, control the general operation and other tasks performed by the host computing device 100, and manage the reloading of the configurable hardware logic device 106, as described and illustrated in more detail later.

The configurable hardware logic device 106 can include specialized hardware configured to implement one or more steps of this technology, as illustrated and described with reference to the examples herein. In this particular example, the configurable hardware logic device 106 can be a field programmable gate array (FPGA), field programmable logic device (FPLDs), application specific integrated circuit (ASIC), programmable logic unit (PLU), and/or any other type of configurable hardware logic device.

The first bus 108 can be a DDR, DRAM or memory bus, by way of example only, although other types of communication channels can also be used. The second bus 110 can be a peripheral component interconnect (PCI) bus, a PCI express (PCIe) bus, a universal serial bus (USB), or an Ethernet-based bus, by way of example only, although the second bus 110 can be any other type of input/output bus that allows dynamic configuration and/or unplug and plug operations, as described and illustrated in more detail herein, and through which data can flow to and/or from the connected configurable hardware logic device 106.

Figure 2:
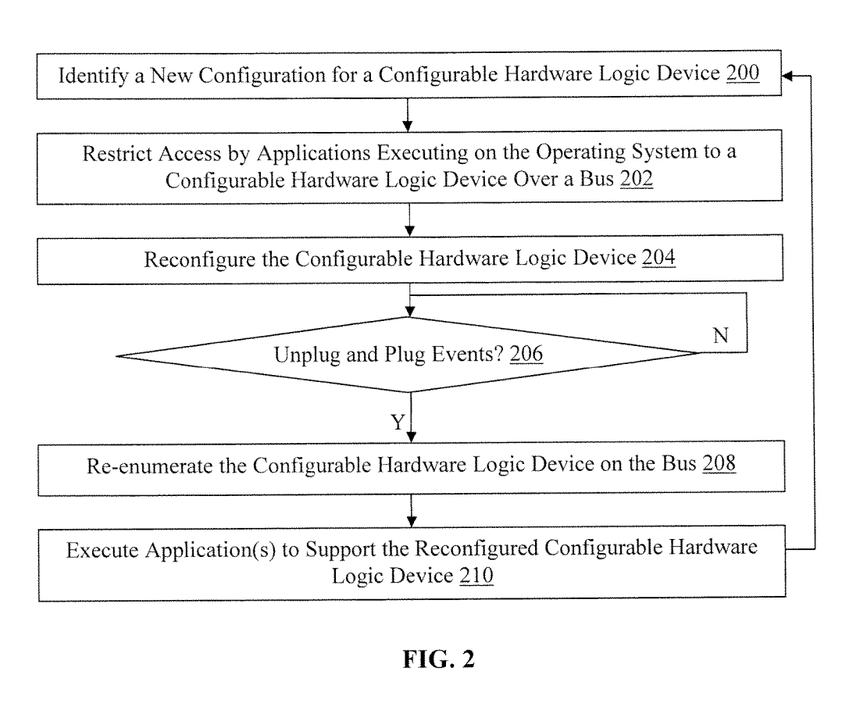
FIG. 2 is a flowchart of an exemplary method for configurable hardware logic device reloading

An exemplary method for configurable hardware logic device reloading will now be described with reference to FIGS. 1-3. Referring more specifically to FIG. 2, a flowchart illustrating an exemplary method for configurable hardware logic device reloading is illustrated. In step 200 in this example, the host computing device 100 identifies a new configuration for the configurable hardware logic device 106. The new configuration can be a partial reconfiguration of the functionality provided by the configurable hardware logic device 106 or can result in a configurable hardware logic device 106 with a completely new configuration, for example.

The host computing device 100 can identify a new configuration based on an administrator's input of new configuration information through a management interface, although other methods for determining a new configuration is required or available, and/or for identifying a new configuration, can also be used. Optionally, the administrator can cause the bit file 112 containing the new configuration to be stored in the memory 104 of the host computing device 100, for example. The bit file 112, when loaded onto the configurable hardware logic device 106, is configured to reconfigure the configurable hardware logic device 106 to provide functionality associated with the new configuration.

In step 202, the host computing device 100 restricts access by one or more of the application(s) 114 executing on the operating system 116 of the host computing device 100 to the configurable hardware logic device 106 over the second bus 110. The one or more of the application(s) 114 that are restricted include all applications that are currently communicating with the configurable hardware logic device 106 or could potentially communicate with the configurable hardware logic device 106 during reconfiguration.

Accordingly, the operating system 116 of the host computing device 100, for example, can terminate any processes or threads associated with the one or more of the application(s) 114, buffer the application I/O, or perform any other method for restricting the one or more of the application(s) 114 from communicating with the configurable hardware logic device 106. Optionally, the host computing device 100 can also restrict the one or more of the application(s) 114 by disabling a respective port at which the configurable hardware logic device 106 is connected to the second bus 110.

In step 204, the host computing device 100 reconfigures at least a portion of the configurable hardware logic device 106. In this example, the operating system 116 of the host computing device 100 can reconfigure the configurable hardware logic device 106 based on the new configuration identified in step 200, such as using the bit file 112 obtained and stored in the memory 104. Optionally, the bit file 112 can be loaded onto the configurable hardware logic device 106 using a direct memory access (DMA) operation or by using a plurality of write operations to register(s) in the memory 104 associated with the configurable hardware logic device 106, for example, although other methods of reloading the configurable hardware logic device 106 can also be used.

In some examples, the configurable hardware logic device 106 supports partial reloading where a portion of the configurable hardware logic device 106 configured to provide functionality required to receive data from the first bus 108 and/or the second bus 110 is maintained. In these examples, only portions of the configurable hardware logic device 106 not required to receive data from the second bus 110 are available to be replaced and/or modified by the new configuration.

In step 206, the host computing device determines when sequential unplug and plug events have been generated by the configurable hardware logic device 106 indicating that the reconfiguration has completed. The configurable hardware logic device 106 can generate an unplug from the second bus 110 to the operating system 116 of the host computing device 100. In this example, the unplug and plug events are warm events generated or simulated without disconnecting power supplied to the configurable hardware logic device 106, although other types and/or numbers of events could be used.

Accordingly, the unplug and plug events are generated without the host computing device 100 being rebooted or otherwise powering down. Additionally, the operating system 116 can advantageously continue operating during the reconfiguration of the configurable hardware logic device 106. Further, the host computing device 100 can continue performing all programmed or normal functionality during the reconfiguration, with the exception of functionality provided by the configurable hardware logic device 106.

Optionally, the new configuration used to reconfigure the configurable hardware logic device 106 in step 204 can be configured to cause the configurable hardware logic device 106 to autonomously generate the unplug and/or plug events. Alternatively, the operating system 116 can command the configurable hardware logic device 106 to generate the unplug and/or plug events, such as by a write operation to a register in the memory 106 associated with the configurable hardware logic device 106, for example. In this example, the operating system 116 can use address space on the second bus 110 that was not used to communicate the new configuration in step 204 in order to communicate the command to generate the unplug and/or plug events, for example.

However, in other examples, the plug event is generated autonomously by the configurable hardware logic device 106 since, subsequent to the generated unplug event, the operating system 116 of the host computing device 100 will be unable to communicate with the configurable hardware logic device 106. Other methods of generating the unplug and/or plug events by the configurable hardware logic device 106 can also be used.

Accordingly, if the host computing device determines in step 206 that unplug and plug events have not yet been generated by the configurable hardware logic device 106, then the No branch is taken back to step 206 and the host computing device effectively waits for the unplug and plug events to be generated. However, if the host computing device determines in step 206 that unplug and plug events have been generated by the configurable hardware logic device 106, then the Yes branch is taken to step 208.

In step 208, the host computing device 100 re-enumerates the configurable hardware logic device 106 on the second bus 110 in response to receiving the generated plug event from the configurable hardware logic device 106. Accordingly, the operating system 116 of the host computing device 100 can reconfigure registers, bus numbers, interrupts, and/or address space, for example, in order to re-enumerate the configurable hardware logic device 106 in view of the new configuration loaded in step 204.

In step 210, the host computing device 100 optionally executes a device driver or other one or more of the application(s) 114 configured to support the reconfigured configurable hardware logic device. Also optionally, subsequent to the re-enumeration, the operating system 116 of the host computing device 100 can allow the restricted one or more of the application(s) 114 to communicate with the configurable hardware logic device 16.

Figure 3:
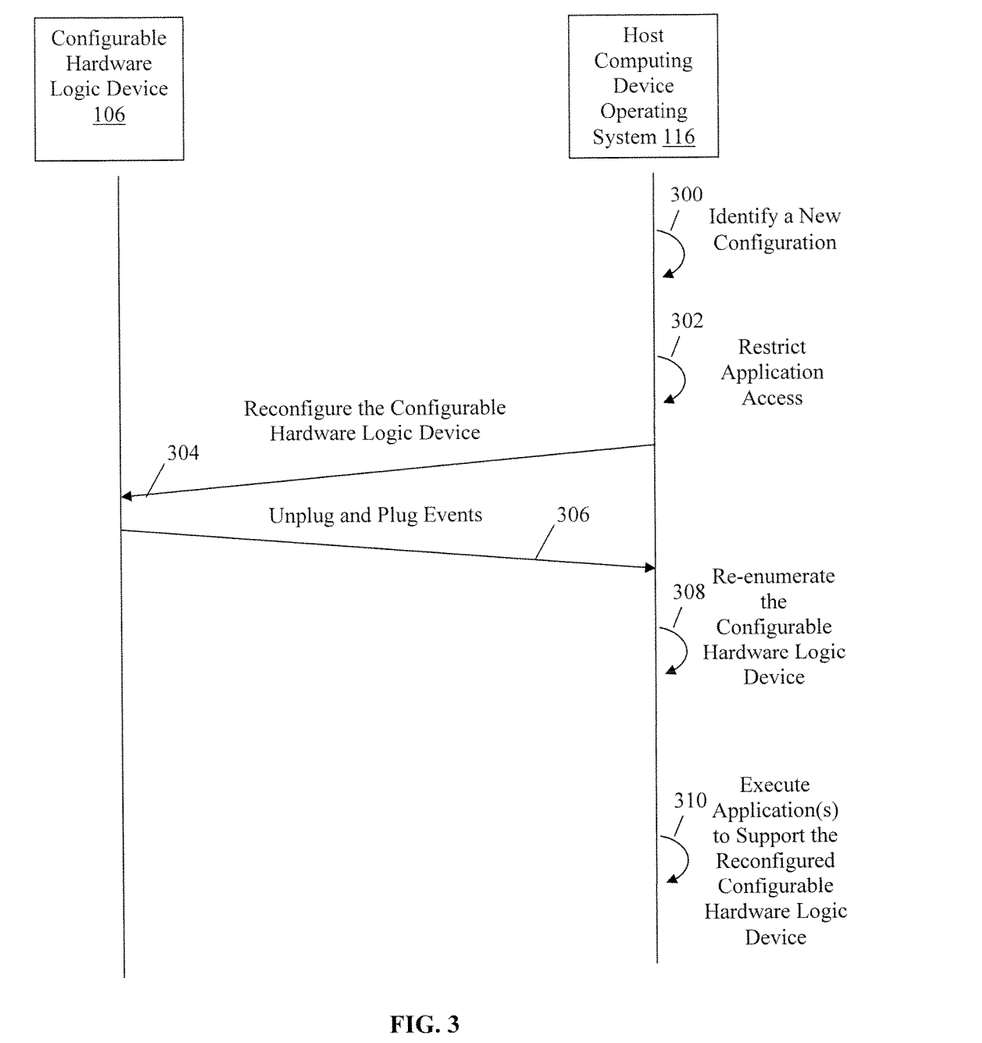
FIG. 3 is a timing diagram illustrating an exemplary method for configurable hardware logic device reloading.

Referring more specifically to FIG. 3, a timing diagram illustrating an exemplary method for configurable hardware logic device reloading is illustrated. In step 300 in this example, the operating system 116 of the host computing device 100 identifies a new configuration for the configurable hardware logic device 106. As described and illustrated in more detail earlier with reference to step 200 of FIG. 2, the new configuration can be input by an administrator through a management interface, for example, although other methods of inputting and/or identifying a new configuration for the configurable hardware logic device 106 can also be used.

In step 302, the operating system 116 of the host computing device 100 restricts access by one or more of the application(s) 114 to the configurable hardware logic device 106. Access by the one or more of the application(s) is restricted so that the one or more of the application(s) do not communicate with the configurable hardware logic device 106 during the reloading.

Access can be restricted by software means and/or by disabling one or more ports of the second bus 110, for example, as described and illustrated in more detail earlier with reference to step 202 of FIG. 2, although other methods of restricting access to the configurable hardware logic device 106 can also be used. Optionally, any communications with the configurable hardware logic device 106 attempted by the one or more of the application(s) 114 can be buffered or can fail gracefully, for example, although the communications can also be handled in other manners.

In step 304, the operating system 116 of the host computing device 100 reconfigures or reloads the configurable hardware logic device 106 based on the new configuration. The configurable hardware logic device 106 can be reconfigured by loading the new configuration stored in a bit file onto the configurable hardware logic device 106, for example, as described and illustrated in more detail earlier with reference to step 204 of FIG. 2, although other methods of reconfiguring the configurable hardware logic device 106 can also be used.

In step 306, the configurable hardware logic device 106 generates unplug and plug events that are communicated to the operating system 116 of the host computing device 100. The configurable hardware logic device 106 can be configured, as part of the new configuration loaded in step 304, to autonomously generated the unplug and/or plug events, as described and illustrated in more detail earlier with reference to step 206 of FIG. 2, although other methods of generating the unplug and plug events can also be used. In this example, the unplug and plug events are warm events generated without disconnecting the power supplied to either the configurable hardware logic device 106 or the host computing device 100.

In step 308, the operating system 116 of the host computing device 100 re-enumerates the configurable hardware logic device 106 on the second bus 110 in view of the new configurations, as described and illustrated in more detail earlier with reference to step 208 of FIG. 2. In step 310, the operating system 116 of the host computing device 100 executes one or more of the application(s) 114, such as a device driver, to support the reconfigured configurable hardware logic device 106, as described and illustrated in more detail earlier with reference to step 210 of FIG. 2.

Accordingly, by this technology, a host computing device can communicate a new configuration to a configurable hardware logic device relatively quickly using a bus and without requiring a reboot of the host computing device and while allowing the operating system to otherwise continue full operation. With this technology, the configurable hardware logic device generates warm unplug and plug events to cause an operating system of the host computing device to re-enumerate the configurable hardware logic device on the bus. Further, the configurable hardware logic device can be reloaded with a new configuration with reduced disruption to the performance of the host computing devices for users and/or other network devices.

Figure 4:
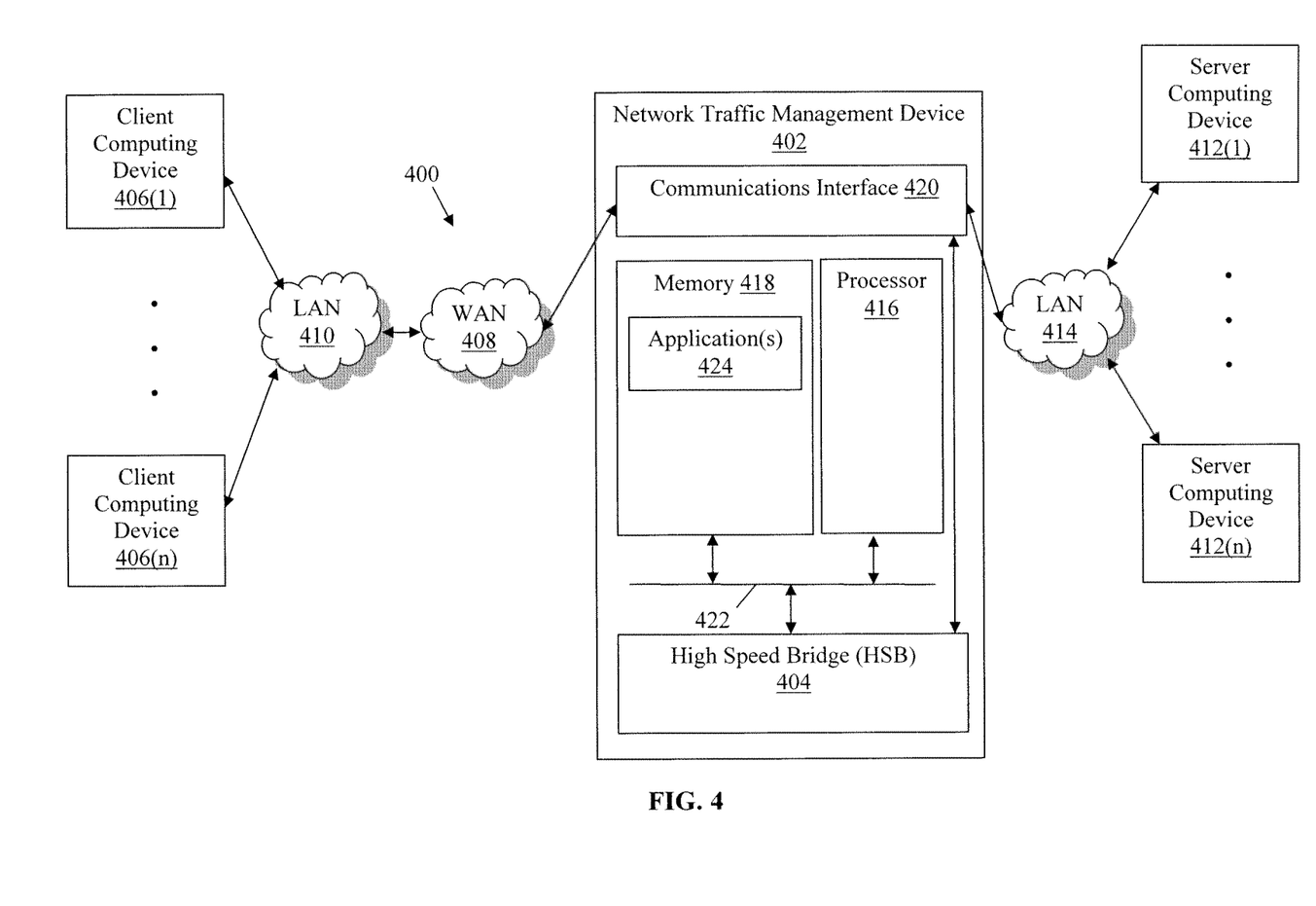
FIG. 4 is a block diagram of a network environment with an exemplary network traffic management host computing device with an exemplary high speed bridge configurable hardware logic device which can reconfigured utilizing this technology.

Referring to FIG. 4, a block diagram of a network environment 400 with an exemplary network traffic management device 402 with an exemplary high speed bridge 404 which can be reconfigured utilizing an example of this technology is illustrated. In this particular example, the network traffic management device 402 is a host computing device for the HSB, which is a configurable hardware logic device, although any other type of computing device can be a host computing device and any other type of configurable hardware logic device configured to provide other types and numbers of functionality can also be used.

In this example, the network traffic management device 402 is coupled to client computing devices 406(1)-406(n) through a wide area network (WAN) 408 and a local area network (LAN) 410 and server computing devices 412(1)-412(n) through another LAN 414, although the network traffic management device 402, client computing devices 406(1)-406(n), and server computing devices 412(1)-412(n) may be coupled together via other topologies and the network environment 400 may include other network devices. The LANs 410 and 414 and/or WAN 408 may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The WAN 408 may be any wide area network (e.g., Internet), although any other type of traffic network topology may be used.

The network traffic management device 402 may perform any number of functions such as optimizing, securing, and/or accelerating the network traffic exchanged between the client computing devices 406(1)-406(n) and the server computing devices 412(1)-412(n). The network traffic management device 402 in this example includes a processor 416, a memory 418, and the HSB 404, which are all coupled together by a bus 422. Additionally, the HSB 404 is directly connected through another communication channel to the communications interface 420. The bus 422 can be a peripheral component interconnect (PCI) bus, a PCI express (PCIe) bus, a universal serial bus (USB), an Ethernet-based bus, or any other type of communication channel. Additionally, the network traffic management device 402 may include other types and numbers of elements in other configurations.

The processor 416 of the network traffic management device 402 may execute programmed instructions stored in the memory 418 of the network traffic management device 402 for the functions identified above for managing network traffic, for example. The processor 416 can be a central processing unit with a plurality of cores, for example, each configured to execute a plurality of traffic management microkernals (TMMs) configured to carry out the instructions stored in the memory 418 for managing network traffic, although any other types of processor can also be used.

The memory 418 of the network traffic management device 402 may include one or more tangible storage media and/or devices, such as RAM, ROM, flash memory, hard disk drive(s), solid state memory, or any other memory storage types or devices, including combinations thereof, which are known to those of ordinary skill in the art. The memory 418 in this example includes application(s) 424, such as the TMMs, that, when executed by the processor 416, are configured to carry out functionality on behalf of the network traffic management device 402.

The HSB 404 can include configurable hardware logic including specialized hardware configured to implement one or more steps of this technology, as illustrated and described with reference to the examples herein. In this particular example, the HSB 404 is a field programmable gate arrays (FPGA), although the HSB 404 can be a field programmable logic device (FPLD), application specific integrated circuit (ASIC), programmable logic unit (PLU), and/or any other type of configurable hardware logic device.

In this example, the HSB 404 is a packet distribution device including sets of direct memory access (DMA) engines. The HSB 404 uses a hash table to identify one of the TMMs for processing network packets received from a switch. The DMA engines correspond to the TMMs executed by the cores of the processor 416 and, accordingly, are configured to facilitate transfer of network packets to the TMMs. Although only one HSB 404 is shown in this example, the network traffic management device 402 can include a plurality of HSBs.

The communication interface of the network traffic management device 402 operatively couples and communicates between the network traffic management device 402, the client computing devices 406(1)-406(n), and the server computing devices 412(1)-412(n), which are all coupled together by the LANs 410 and 414 and the WAN 408, although other types and numbers of communication networks or systems with other types and numbers of connections and configurations to other devices and elements can also be used. By way of example only, the LANs 410 and 414 and the WAN 408 can use TCP/IP over Ethernet and industry-standard protocols, including NFS, CIFS, SOAP, XML, LDAP, and SNMP, although other types and numbers of communication networks, can be used.

Each of the client computing devices 406(1)-406(n) and server computing devices 412(1)-412(n) in this example includes at least a processor, a memory, and a communication interface, which are coupled together by a bus or other communication link, although other numbers and types of network devices with other elements could be used. The client computing devices 406(1)-406(n) may run interface applications, such as Web browsers, that may provide an interface to make requests for and receive content stored on one or more of the server computing devices 412(1)-412(n) via the LANs 410 and 414 and the WAN 408, for example.

Generally, the server computing devices 412(1)-412(n) process requests received from requesting client computing devices 406(1)-406(n) via the LANs 410 and 414 and the WAN 408 according to the HTTP-based application RFC protocol or the CIFS or NFS protocol, for example. Various network processing applications, such as CIFS applications, NFS applications, HTTP Web Server computing device applications, and/or FTP applications, may be operating on the server computing devices 412(1)-412(n) and transmitting data (e.g., files or Web pages) to the network traffic management device 402 in response to requests from the client computing devices 406(1)-406(n).

Using this technology, as described and illustrated by way of the examples described and illustrated herein with reference to FIGS. 2 and/or 3, the network traffic management device 402 can reload or reconfigure the HSB 404 without rebooting or disconnecting and reconnecting the power supplied to the HSB 404 or network traffic management device 402. Accordingly, users of the client computing devices 406(1)-406(n) will advantageously experience reduced disruption when the HSB needs to be reconfigured. For example, buffered network traffic can be processed by the network traffic management device 402 subsequent to the HSB 404 being reconfigured in less time with this technology than would otherwise result if the network traffic management was rebooted in order to initiate the re-enumeration of the HSB 404 on the bus 422.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for configurable hardware logic device reloading implemented by a host computing system comprising one or more host computing apparatuses, client devices or server devices, the method comprising:
   identifying a new configuration to be loaded for a configurable hardware logic device, wherein the new configuration is received by the configurable hardware logic device using a first bus;
   restricting access by one or more applications to the configurable hardware logic device over a second bus, upon identifying the new configuration is to be loaded for the configurable hardware logic device;
   reconfiguring at least a portion of the configurable hardware logic device;
   determining when unplug and plug events have been generated by the configurable hardware logic device, wherein the unplug and plug events are generated without disconnecting power supplied to the configurable hardware logic device and the unplug and plug events are received using the second bus;
   re-enumerating the configurable hardware logic device on the bus, when the unplug and plug events are determined to have been generated by the configurable hardware logic device; and
   allowing the restricted one or more applications to communicate with the configurable hardware logic device, subsequent to the re-enumeration of the configurable hardware logic device.

2. The method as set forth in claim 1 wherein the unplug and plug events are warm events generated sequentially: and
   waiting for the unplug and plug events to be generated by the configurable hardware logic device, when it is determined that the unplug and plug events have not been generated.

3. The method as set forth in claim 1 wherein the reconfiguring further comprises partial reloading the configurable hardware logic device with a bit file using the first bus; and
   wherein the partial reloading further comprises maintaining a portion of the configurable hardware logic device that is configured to receive data from the second bus.

4. The method as set forth in claim 1 wherein the configurable hardware logic device is connected to the first bus at a port and the restricting further comprises disabling the port; and
   wherein the reconfiguring further comprises reconfiguring the at least a portion of the configurable hardware logic device using the second bus.

5. The method as set forth in claim 1 wherein the configurable hardware logic device is reconfigured at least in part to cause the configurable hardware logic device to autonomously generate the plug event.

6. A host computing apparatus, comprising a memory comprising programmed instructions stored thereon and one or more processors configured to be capable of executing the stored programmed instructions to:
   identify a new configuration to be loaded for a configurable hardware logic device, wherein the new configuration is received by the configurable hardware logic device using a first bus;
   restrict access by one or more applications to the configurable hardware logic device over a second bus, upon identifying the new configuration is to be loaded for the configurable hardware logic device;
   reconfigure at least a portion of the configurable hardware logic device;
   determine when unplug and plug events have been generated by the configurable hardware logic device, wherein the unplug and plug events are generated without disconnecting power supplied to the configurable hardware logic device and the unplug and plug events are received using the second bus;
   re-enumerate the configurable hardware logic device on the bus, when the unplug and plug events are determined to have been generated by the configurable hardware logic device; and
   allow the restricted one or more applications to communicate with the configurable hardware logic device, subsequent to the re-enumeration of the configurable hardware logic device.

7. The apparatus as set forth in claim 6 wherein the unplug and plug events are warm events generated sequentially; and
   wait for the unplug and plug events to be generated by the configurable hardware logic device, when it is determined that the unplug and plug events have not been generated.

8. The apparatus as set forth in claim 6 wherein the wherein the one or more processors are further configured to be capable of executing the stored programmed instructions to partially reload the configurable hardware logic device with a bit file using the first bus; and
   wherein the partial reloading further comprises maintaining a portion of the configurable hardware logic device that is configured to receive data from the second bus.

9. The apparatus as set forth in claim 6 wherein the configurable hardware logic device is connected to the first bus at a port and the restricting further comprises disabling the port; and
   wherein the reconfiguring further comprises reconfiguring the at least a portion of the configurable hardware logic device using the second bus.

10. The apparatus as set forth in claim 6 wherein the configurable hardware logic device is reconfigured at least in part to cause the configurable hardware logic device to autonomously generate the plug event.

11. A non-transitory computer readable medium having stored thereon instructions for configurable hardware logic device reloading comprising executable code which when executed by one or more processors, causes the one or more processors to:
   identify a new configuration to be loaded for a configurable hardware logic device, wherein the new configuration is received by the configurable hardware logic device using a first bus;
   restrict access by one or more applications to the configurable hardware logic device over a second bus, upon identifying the new configuration is to be loaded for the configurable hardware logic device;
   reconfigure at least a portion of the configurable hardware logic device;
   determine when unplug and plug events have been generated by the configurable hardware logic device, wherein the unplug and plug events are generated without disconnecting power supplied to the configurable hardware logic device and the unplug and plug events are received using the second bus;

re-enumerate the configurable hardware logic device on the bus, when the unplug and plug events are determined to have been generated by the configurable hardware logic device; and allow the restricted one or more applications to communicate with the configurable hardware logic device, subsequent to the re-enumeration of the configurable hardware logic device.

12. The non-transitory computer readable medium as set forth in claim 11 wherein the unplug and plug events are warm events generated sequentially; and wait for the unplug and plug events to be generated by the configurable hardware logic device, when it is determined that the unplug and plug events have not been generated.

13. The non-transitory computer readable medium as set forth in claim 11 wherein the executable code when executed by the one or more processors further causes the one or more processors to partially reload the configurable hardware logic device with a bit file using the first bus; and wherein the partial reloading further comprises maintaining a portion of the configurable hardware logic device that is configured to receive data from the second bus.

14. The non-transitory computer readable medium as set forth in claim 11 wherein the configurable hardware logic device is connected to the first bus at a port and the restricting further comprises disabling the port; and wherein the reconfiguring further comprises reconfiguring the at least a portion of the configurable hardware logic device using the second bus.

15. The non-transitory computer readable medium as set forth in claim 11 wherein the configurable hardware logic device is reconfigured at least in part to cause the configurable hardware logic device to autonomously generate the plug event.

16. A host computing system, comprising one or more host computing apparatuses, or server devices, the host computing system comprising memory comprising programmed instructions stored thereon and one or more processors configured to be capable of executing the stored programmed instructions to:

identify a new configuration to be loaded for a configurable hardware logic device, wherein the new configuration is received by the configurable hardware logic device using a first bus;

restrict access by one or more applications to the configurable hardware logic device over a second bus, upon identifying the new configuration is to be loaded for the configurable hardware logic device;

reconfigure at least a portion of the configurable hardware logic device;

determine when unplug and plug events have been generated by the configurable hardware logic device, wherein the unplug and plug events are generated without disconnecting power supplied to the configurable hardware logic device and the unplug and plug events are received using the second bus;

re-enumerate the configurable hardware logic device on the bus, when the unplug and plug events are determined to have been generated by the configurable hardware logic device; and allow the restricted one or more applications to communicate with the configurable hardware logic device, subsequent to the re-enumeration of the configurable hardware logic device.

17. The host computing system as set forth in claim 16 wherein the unplug and plug events are warm events generated sequentially; and wait for the unplug and plug events to be generated by the configurable hardware logic device, when it is determined that the unplug and plug events have not been generated.

18. The host computing system as set forth in claim 16 wherein the one or more processors are further configured to be capable of executing the stored programmed instructions to partially reload the configurable hardware logic device with a bit file using the first bus; and wherein the partial reloading further comprises maintaining a portion of the configurable hardware logic device that is configured to receive data from the second bus.

19. The host computing system as set forth in claim 16 wherein the configurable hardware logic device is connected to the first bus at a port and the restricting further comprises disabling the port; and wherein the reconfiguring further comprises reconfiguring the at least a portion of the configurable hardware logic device using the second bus.

20. The host computing system as set forth in claim 16 wherein the configurable hardware logic device is reconfigured at least in part to cause the configurable hardware logic device to autonomously generate the plug event.

* * * * *